US008000084B2

(12) United States Patent
Siggel et al.

(10) Patent No.: US 8,000,084 B2
(45) Date of Patent: Aug. 16, 2011

(54) HIGH VOLTAGE ELECTROLYTES

(75) Inventors: Alfred Siggel, Seelze (DE); Sonja Demel, Wunstorf (DE); Thirumalai G. Palanisamy, Morristown, NJ (US); Michael Fooken, Seelze (DE); Brian O'Leary, Milburn, NJ (US); Jeremy Diringer, Morristown, NJ (US)

(73) Assignee: Honeywell International, Inc., Morristown, NJ (US)

( * ) Notice: Subject to any disclaimer, the term of this patent is extended or adjusted under 35 U.S.C. 154(b) by 221 days.

(21) Appl. No.: 11/828,034

(22) Filed: Jul. 25, 2007

(65) Prior Publication Data

US 2009/0027827 A1 Jan. 29, 2009

(51) Int. Cl.
*H01G 9/00* (2006.01)
*H01G 9/02* (2006.01)
*H01M 6/04* (2006.01)

(52) U.S. Cl. ...... 361/502; 361/504; 252/62.2; 29/25.03

(58) Field of Classification Search .................. 361/502, 361/503, 504; 252/62.2; 29/25.03
See application file for complete search history.

(56) References Cited

U.S. PATENT DOCUMENTS

| 4,439,501 | A | * | 3/1984 | Flanagan | 429/70 |
|---|---|---|---|---|---|
| 4,467,395 | A | * | 8/1984 | Ross | 361/315 |
| 4,526,846 | A | * | 7/1985 | Kearney et al. | 429/336 |
| 4,609,596 | A | | 9/1986 | Hitchcock et al. | |
| 5,019,466 | A | | 5/1991 | Coetzer et al. | |
| 5,378,445 | A | | 1/1995 | Salmon et al. | |
| 5,496,661 | A | * | 3/1996 | Mao | 429/331 |
| 5,506,068 | A | * | 4/1996 | Dan et al. | 429/50 |
| 5,690,808 | A | | 11/1997 | Akmal et al. | |
| 5,706,165 | A | * | 1/1998 | Saito et al. | 361/502 |
| 5,846,673 | A | | 12/1998 | Saidi et al. | |
| 6,072,693 | A | * | 6/2000 | Tsushima et al. | 361/502 |
| 6,077,628 | A | * | 6/2000 | Takechi et al. | 429/325 |
| 6,187,491 | B1 | | 2/2001 | Ferrar et al. | |
| 6,221,533 | B1 | * | 4/2001 | Kusumoto et al. | 429/328 |
| 6,280,878 | B1 | * | 8/2001 | Maruyama et al. | 429/233 |
| 6,475,679 | B1 | * | 11/2002 | Tsutiya et al. | 429/339 |
| 6,811,927 | B1 | * | 11/2004 | Urairi et al. | 429/314 |
| 6,914,768 | B2 | * | 7/2005 | Matsumoto et al. | 361/502 |
| 6,934,144 | B2 | * | 8/2005 | Ooma et al. | 361/303 |
| 6,960,425 | B2 | * | 11/2005 | Jung et al. | 430/323 |
| 7,056,621 | B2 | * | 6/2006 | Sato et al. | 429/209 |
| 7,498,102 | B2 | * | 3/2009 | Oh et al. | 429/313 |
| 2002/0138958 | A1 | * | 10/2002 | Nonaka et al. | 29/25.03 |
| 2003/0202316 | A1 | | 10/2003 | Kawasato et al. | |
| 2005/0041371 | A1 | * | 2/2005 | Kawata et al. | 361/503 |
| 2005/0186478 | A1 | | 8/2005 | Iwakura et al. | |
| 2006/0269844 | A1 | | 11/2006 | Deng et al. | |
| 2007/0189946 | A1 | * | 8/2007 | Ivanov et al. | 423/179.5 |

FOREIGN PATENT DOCUMENTS

| JP | 09082578 A | * | 3/1997 |
|---|---|---|---|
| JP | 11054378 A | * | 2/1999 |
| JP | 2000113906 A | * | 4/2000 |
| JP | 2000357537 A | * | 12/2000 |
| WO | 2004/039761 | | 5/2004 |

OTHER PUBLICATIONS

Erik J. Brandon, "Extending the low temperature operational limit of double-layer capacitors"; ScienceDirect, Journal of Power Sources 170 (2007) 225-232; www.sciencedirect.com.

\* cited by examiner

*Primary Examiner* — Eric Thomas
*Assistant Examiner* — David M Sinclair

(57) ABSTRACT

A method for reducing pressure build-up in an electrochemical cell is provided comprising: providing an anhydrous non-aqueous electrolyte solution comprising at least one quaternary ammonium salt and at least one anhydrous nonaqueous solvent; contacting the electrolyte solution with at least one acid scavenger; and loading the nonaqueous electrolyte solution into the electrochemical cell. Also, provided is an electric double-layer capacitor (supercapacitor) comprising a free acid scavenger.

26 Claims, No Drawings

HIGH VOLTAGE ELECTROLYTES

BACKGROUND

1. Field of Invention

This invention relates to electrolytes and electrochemical storage devices. More particularly, this invention relates to high performance nonaqueous electrolytes and electric double layer capacitors (supercapacitors).

2. Description of Related Art

An electric double-layer capacitor (EDLC) is an electrochemical capacitor that has an unusually high energy density compared to common capacitors. They are of particular interest in applications requiring high rates of charge and discharge, little degradation of potential over hundreds of thousands of cycles, good reversibility, and high cycle efficiency.

Typically, EDLCs are constructed with nonaqueous electrolytic solutions containing quaternary ammonium in one or more organic solvents such as propylene carbonate, gamma-butyrolactone, acetonitrile, sulfolane derivate, and linear carbonates such as N-diethyl methyl chitosan (DEMC), diethyl carbonate (DEC), and dimethyl carbonate (DMC). Although an EDLC can utilize aqueous electrolytes, such as those containing mineral acids, it is known that the maximum operational voltage of such EDLCs is typically limited to 0.8V because water in the electrolyte undergoes decomposition above this voltage. In contrast, EDLCs using anhydrous nonaqueous electrolytes can operate at a voltage of over 2.5V. EDLCs using nonaqueous electrolytes also are capable of storing, in certain cases, up to 10 times more energy than typical EDLCs using aqueous electrolytes because the electrostatic energy content of a EDLC corresponds to the square of the maximum operation voltage.

However, it is also known that EDLCs which utilize nonaqueous electrolytes suffer from an internal pressure buildup as they age. This pressure buildup can result in the EDLC's seals leaking or rupturing. To mitigate this pressure buildup, EDLCs are often designed to operate at voltage below 2.5V.

High operating voltages also tend to lower the lifetime of an EDLC due to pressure buildup. The pressure increase inside the cell depends on the electrode characteristics and on the electrolyte characteristics. For example, EDLCs with nonaqueous electrolytes operate well above the decomposition voltage of water and, therefore, any water impurities initially present in the cell, particularly water contained in the electrolyte, will quickly undergo electrolysis resulting in gas formation. This gas formation leads to a quick pressure buildup during the first charging. Accordingly, it is common to use a nonaqueous electrolyte solution that is as dehydrated as possible.

Interactions between the electrode and the electrolyte can also lead to gas generation. The positive and negative electrodes of an EDLC commonly are constructed of activated carbon or graphite. These materials typically contain functional group impurities, such as hydroxyl, carboxyl, carbonyl, and/or ketone moieties, which undergo electrochemical redox reactions upon application of a voltage, thus leading to gas generation. Therefore, the activated carbon material for an electrode is carefully selected to minimize functional group impurities.

Although problems associated with gas build up are usually detected by careful lifetime tests, in which the capacitors are subjected to the nominal voltage at elevated temperatures for a representative period, this long lasting test yields little information about the origin of the underlying chemical reactions leading to the failure. Beyond the use of carbon with less functional groups and well dehydrated nonaqueous electrolyte solutions, scant information is available regarding the mechanisms responsible for pressure build-up in an EDLC or means for its reduction.

Although little is known about the conditions that effect the pressure build-up in EDLCs using anhydrous nonaqueous electrolytes, others have addressed the problem of pressure build-up in lithium ion batteries. For example, Salmon et al. (U.S. Pat. No. 5,378,445) describes the use of ammonia gas to treat a lithium ion battery electrolyte to eliminate gas generation due to the presence of acid. Zhongyi Deng et al. (US 2006/0269844) addresses the gassing problem in lithium ion battery electrolyte caused by the presence of acid by treating the electrolyte with triazine compounds.

Although the lithium ion battery typically uses a nonaqueous electrolyte, the composition of the salt, as well as the solvent, is quite different than super capacitors. As a result, the operational characteristics of lithium ion batteries are not directly applicable to the types of nonaqueous electrolyte used in electric double-layer capacitors. In particular, lithium ion batteries use nonaqueous electrolytes comprising lithium hexafluorophosphate ($LiPF_6$) salt, which exhibits very good electrochemical stability and conductivity when dissolved in binary or ternary solvents including cyclic carbonates such as ethylene carbonate (EC) (also called cyclic ethylene ester), and linear carbonates such as dimethyl carbonate (DMC), diethyl carbonate (DEC), ethyl methyl carbonate (EMC). However, $LiPF_6$ is not thermally stable and readily decomposes at elevated temperatures forming gaseous and very reactive $PF_5$. Under such conditions $PF_5$, in turn, typically reacts with solvents or $LiPF_6$ to produce more gaseous compounds.

EDLC electrolytes avoid this problem because they do no contain the lithium hexafluorophosphate ($LiPF_6$) salt. Also, unlike lithium ion batteries, EDLC have electrodes that are constructed, for example, of activated carbon. The activated carbon is produced by partial oxidation of carbon using steam, acid or alkali, and thus invariably possess functional groups like hydroxyl, carboxyl, ketone, and carbonyl which participate in a redox reaction to form carbon monoxide, carbon dioxide, methane and hydrogen. EDLC electrolytes can also utilize cyclic carbonate and nitrile solvents and tetraalkylammonium tetrafluoroborates.

Honda, et al., (US 2003/0202316) reports the additives chlorobenzene and fluorobenzene can be used to reduce pressure build up in EDLCs due to gas generation. However, it is believed that these additives work via a physical mechanism by blocking the access to or covering the catalytic surfaces in the carbon.

Thus, there remains a need for methods for reducing the pressure inside an EDLC and for EDLC's having long life and/or a high operating voltage.

SUMMARY OF THE INVENTION

This invention provides, in one aspect, methods to reduce gas pressure buildup. Applicants have surprisingly found that acid catalyzed reactions occurring in an anhydrous nonaqueous electrolyte of an EDLC are the main source of gas generation (and hence pressure buildup), even when the concentration of free acid in the electrolyte is very low. Applicants have also found that a variety of acid scavengers can be used to reduce gas generation and, thus, mitigate the harmful effects associated with the free acids. By reducing the gas generation and maintaining a relatively low pressure in an EDLC, the EDLC can operate at a higher voltage and for longer periods of time.

Accordingly, an aspect of the invention is a method for reducing pressure build-up in an electrochemical cell comprising providing an anhydrous nonaqueous electrolyte solution comprising at least one quaternary ammonium salt and at least one anhydrous nonaqueous solvent; contacting said electrolyte solution with at least one acid scavenger; and loading said nonaqueous electrolyte solution into said electrochemical cell.

Another aspect of the invention, provides an electrolyte comprising: a solution comprising at least one quaternary ammonium salt and at least one anhydrous nonaqueous solvent; and (b) an acid scavenger present in an amount of about 1000 parts per million to about 10,000 parts per million relative to said salt, wherein said acid scavenger is dissolved or suspended in said solution.

According to yet another aspect of the invention, provided is an electric double-layer capacitor comprising: (a) a cell having two electrodes; (b) an electrolyte solution disposed within said cell comprising a solution having at least one quaternary ammonium salt and at least one anhydrous nonaqueous solvent; and (c) an acid scavenger disposed within said cell.

DETAILED DESCRIPTION OF PREFERRED EMBODIMENTS OF THE INVENTION

The present invention involves in one aspect the use of an acid scavenger to reduce the concentration of free acid in an anhydrous nonaqueous electrolyte, particularly electrolytes for use in electric double-layer capacitors. The acid scavengers are preferably added to, or are present in, the electrolyte where they remove, inactive, and/or neutralize unwanted free acids. Accordingly, the electrolyte's free acid concentration is reduced by contacting the electrolyte with the acid scavenger. The contacting can occur, for example, during the production of the electrolyte, before the electrolyte is loaded into the EDLC, and/or after the electrolyte is loaded into the EDLC. The timing of the contacting is determined, in part, by the targeted source of free acid.

Sources of free acid in electrolytes include, for example, impurities introduced into the electrolyte during its production and reactions occurring within the electrolyte that liberate free acids. Such reactions can involve electrolyte impurities and electrochemical redox reactions involving a carbon electrode in contact with the electrolyte. Applicants have also found that such reactions include electrochemical decomposition reactions occurring within the electrolyte. For example, it was found that hydrogen fluoride can form in a tetraethylammonium-tetrafluoroborate/acetonitrile electrolyte solution, even in the absence of moisture. Therefore, in certain preferred embodiments, the acid scavenger is a composition effective at removing or neutralizing a particularly targeted acid, such as hydrogen fluoride.

In certain embodiments, the acid scavenger is a solid or semi-solid material. Solid or semi-solid acid scavengers are particularly useful for applications in which an immobilized acid scavenger is advantageous. For example, a solid acid scavenger can be used during the preparation of an electrolyte to reduce the electrolyte's initial acid concentration to less than 1 part-per-million (ppm). In many preferred embodiments, EDLCs using such an acid-free anhydrous electrolyte exhibit substantially constant internal pressure during their initial operation.

Applicants have found that even if all free acid is initially removed from an EDLC's electrolyte, the electrolyte will, nevertheless, eventually tend to develop a concentration of free acid. Such EDLCs tend to exhibit a gradual increase in pressure over time after an initial period of no pressure increase. To prevent pressure build-up from occurring inside the cell, an acid scavenger is preferably in certain embodiments incorporated directly into the EDLC. For certain applications, solid acid scavengers are preferred because they can be immobilized within the EDLC.

Examples of solid materials include films, membranes, coatings, lattices, pellets, and particulate matter. Examples of semisolid materials include gels and other materials that have certain physical properties, such as rigidity, that are intermediate between solids and liquids. Preferred solids or semi-solid acid scavengers that can be practiced with the present invention include natural or synthetic zeolite or other molecular sieve capable of ion exchange; natural or synthetic basic alumina; magnesium oxide; silica-based ion exchange resin containing at least one function group acting as a Lewis base; and solid polymer or copolymer containing at least one functional group acting as a Lewis base.

Functional groups acting as a Lewis base are those that have a lone electron pair in a bonding orbital, and thus are capable of accepting an ion with a single positive charge. Examples of preferred functional groups include free amines, free ammonia, sulfite, and amine, imide, imine, and amino groups that function as a Lewis base.

Examples of preferred silica-based ion exchange resins include those having a structure according to Formula I:

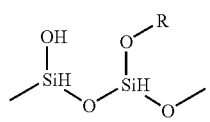

(Formula I)

wherein R is selected from the group consisting of $NR'_2$, $NR'H$, and $NH_2$, and R' is a $C_1$-$C_6$ alkyl, cycloalkyl, or aryl.

Examples of preferred solid polymers or copolymers include those derived, at least in part, from monomers such as alkylamine, carbodiimide, alkylamino alkane, alkylamino-oxo-imino, and styrene substituted with a primary, secondary, or tertiary amine; and derivatives and precursors thereof. Particularly preferred are polycarboiimides and polyamines such as poly(allylamine), poly(diallylalkylamine) and poly(alkylamino)alkane, and poly(alkylamino)(oxo-alkyl)imino alkane. Particularly preferred styrene-based polymers include polystyrene and copolymers such as polystyrene/divinylbenzene and acryl/divinylbeneze, wherein at least one of the styrene monomers is substituted with a primary, secondary, or tertiary amine. Examples of such substituted styrene moieties include those having the structure according to Formula II:

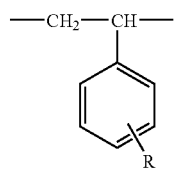

(Formula II)

wherein R is selected from the group consisting of $NR'_2$, $NR'H$, and $NH_2$, and R' is a $C_1$-$C_6$ alkyl, cycloalkyl, or aryl.

Alternatively, or in addition to solid acid scavengers, the present invention contemplates, in preferred embodiments, the use of acid scavengers that are liquid or a composition that is readily soluble in a particular electrolyte. Such embodiments are advantageous in that the acid scavenger can be incorporated directly into the desired electrolyte to either reduce the initial concentration of free acid, or to prevent an increase in the concentration of free acid over time.

Examples of preferred acid scavengers that are soluble in anhydrous electrolytes include compounds having a nitrogen heteroatom that can function as a Lewis base. Such compounds include, but are not limited to, triethylamine, imidazole, oleylamin, pyridine, formamid, N-alkyl-formamid, N-alkyl-pyrolidone, dicyclohexylurea, N,N-dimethyldodecylamin, methyl-imidazole, xxazole, diazobicycloundecen, N,N'-diicyclohexylcarbodiimide, bis(trimethylsilyl)carbodiimide, low molecular weight polycarbodiimide, 2-tert-butyl-imino-2-diethylamino-1,3-dimethyl-perhydro-1,3,2-diazaphosphorine, 1-tert-octyl-4,4,4-tris(dimethylamino)-2,2-bis[tris(dimethylamino)phosphoranylidenamino]-2$^5$,4$^5$-catenadi(phosphazene), The use of acid scavengers is particularly advantageous in EDLCs, although the present invention contemplates that they are applicable to other electrochemical storage devices as well, provided that such devices utilize an anhydrous electrolyte solution. Particularly preferred electrolyte solutions include those comprising a quaternary ammonium such as tetraalkylammonium tetrafluoroborate, and preferably tetraethylammonium tetrafluoroborate. Preferred solvents for such electrolyte solutions include nitriles, such as acetonitrile and propionitrile, and linear or cyclic carbonates, such as dimethyl carbonate, diethyl carbonate, ethyl methyl carbonate, propylene carbonate, and ethylene carbonate, and sulfo lanes and substituted sulfo lanes. The solvent may further comprise a cosolvent.

Preferably, an anhydrous electrolyte solution comprising a quaternary ammonium will have an acid scavenger concentration of at least about 1000 to about 10,000 ppm.

In certain highly preferred embodiments, anhydrous electrolytes according to the present invention are prepared in accordance with the methods described in WO 2004/039761, which is incorporated herein by reference, but using an excess of free amine. For example, an anhydrous electrolyte according to the present invention can be prepared via a direct process wherein a tetraalkylammonium halide with an excess of free amine, such as triethylamine, is reacted with metal tetrafluoroborates in an organic solvent that is miscible with water. The resulting tetraalkylammonium/tetrafluoroborate electrolyte contains triethylamine as an acid scavenger, which is particularly useful in removing and/or neutralizing hydrogen fluoride.

Electric double-layer capacitors utilizing nonaqueous electrolytes and an acid scavenger can operate at voltages greater than about 2.5V, can operate for extended periods of time compared to EDLCs without an acid scavenger, or both. In certain embodiments, an EDLC is provided that can operate at a voltage of greater than about 2.7V. In certain other embodiments, an EDLC is provided that can operate at a voltage about 0.2 to about 0.4V higher than a comparable EDLC without an acid scavenger.

EXAMPLES

The present invention is further illustrated by the following examples.

Examples 1-6 and Comparative Example 1

These examples demonstrate the use of an acid scavenger to reduce the concentration of free acid in an electrolyte as it is being prepared.

Comparative Example 1

Tetraethylammonium tetrafluoroborate (TEABF$_4$) was dissolved in acetonitrile to a concentration of 1 mol/l and the water was removed to less than 20 ppm by contacting it with a desiccant. Conductivity of this electrolyte solution was 55 mS/cm at 25° C. In addition, the amount of free acid was determined as 35 ppm by diluting 10 ml electrolyte with 10 ml of high purity water and titrating with 0.01 mol/l potassium hydroxide solution until a pH of 7 was reached. Under protective gas in a glove box, 17.5 g of the electrolyte was filled into a 350F carbon-carbon electric double-layer capacitor (EDLC) having a volume of 55 ml, which was vacuum dried upfront at 140° C. for 4 days. The EDLC was sealed and allowed to settle for 24 hours before used for a pressure test. In this test a calibrated pressure sensor was attached to the EDLC, the EDLC was heated up to a temperature of 65° C., a voltage of 3V was applied, and the resulting pressure and current was monitored. The leakage current after 24 hours was less than about 0.02 A. From the linear part of the pressure curve between 24 and 70 hours the pressure increase rate of about 17.5 mbar/h was calculated. The pressure at the end of the life test was estimated by extrapolating the hourly rate up to 2000 hours. A summary of the results of this example is provided in Table 1.

Example 1

Example 1 was prepared in a manner identical to Comparative Example 1 with the exception of stirring the electrolyte for 24 hours with 10 wt % of activated aluminum oxide powder after the drying. The activated aluminum oxide has basic surface groups and will react with free acid to form an insoluble solid in the electrolyte and removing the acid or acidic compounds. The precipitate can be removed by filtration. After this treatment, free acid was not detectable. In the pressure test the EDLC containing this electrolyte, the EDLC showed a much lower pressure increase rate of about 15 mbar/h. The leakage current after 24 hours was less than about 0.02 A. A summary of the results of this example is provided in Table 1.

Examples 2-6

The procedure of Example 1 was repeated, except that the activated aluminum oxide was replaced with the acid scavenger indicated in Table 1. A summary of the results of these examples is provided in Table 1.

TABLE 1

| Example | Treatment with | Free acid | Test conditions | Pressure increase rate | Est. pressure after 2000 h | Leakage current |
|---|---|---|---|---|---|---|
| Comparative Example 1 | (none) | 35 ppm | 3.0 V, 65° C. | 17.5 mbar/h | 34 bar | <0.02 A |
| Example 1 | Activated aluminum oxide, basic, powder | 0 ppm | 3.0 V, 65° C. | 15 mbar/h | 30 bar | <0.02 A |

TABLE 1-continued

| Example | Treatment with | Free acid | Test conditions | Pressure increase rate | Est. pressure after 2000 h | Leakage current |
|---|---|---|---|---|---|---|
| Example 2 | soda-lime glass powder | 21 ppm | 3.0 V, 65° C. | 16.5 mbar/h | 33 bar | <0.02 A |
| Example 3 | Aluminosilicate powder | 4 ppm | 3.0 V, 65° C. | 12.5 mbar/h | 25 bar | <0.02 A |
| Example 4 | Sodium aluminosilicate, molecular sieve 4A-NA pellets | 0 ppm | 3.0 V, 65° C. | 13.8 mbar/h | 27.6 bar | <0.02 A |
| Example 5 | Potassium aluminosilicate, molecular sieve UOP XH-6 pellets | 0 ppm | 3.0 V, 65° C. | 13.5 mbar/h | 27 bar | <0.02 A |
| Example 6 | Free base anion exchangers pellets, Dowex M43 | 0 ppm | 3.0 V, 65° C. | 13.5 mbar/h | 29 bar | <0.02 A |

These examples show that various reactive materials can be used as solid acid polisher during electrolyte preparation for reducing the amount of free acid in an electrolyte.

The method generally involves stirring the desired electrolyte with the acid removing agent. Especially advantageous is the use of molecular sieves pellets made from alumino silicate because powder removal requires more intensive filtration to give a clear electrolyte. In addition with the molecular sieve pellets the drying and acid removal steps can be combined into a single treatment in which the contact time between electrolyte and molecular sieve is prolonged until not only the water but also the amount of free acid is removed. For practical purpose the resulting increase in light metal contents as sodium and potassium some of these acid scavengers release into the process stream is often tolerable.

For more demanding applications requiring very pure electrolytes free of light metal ions, free base anion exchanger pellets can be used which are not releasing any light metals back into the electrolyte.

Examples 7-26 and Comparative Example 2

These examples demonstrate the use of an acid scavenger dissolved in an electrolyte to reduce and/or maintain the concentration of free acid in the electrolyte after it is loaded into an electrochemical cell.

While the solid acid polishers of Examples 1-6 can be used as acid scavengers for reducing the amount of free acid in an electrolyte during processing, they are not able to prevent the formation of fresh acid occurring after the treatment, for example because the electrolyte is contaminated prior to the filling into the EDLC or because the EDLC itself contains traces of moisture, leading to a hydrolysation of the electrolyte when filled.

Certain embodiments of the invention overcome this problem by dissolving or suspending an acid scavenger permanently in the electrolyte. Examples 7-26 demonstrate the use of acid scavengers that will react with acidic compounds, including mineral and organic acids, and can stay permanently in the electrolyte without exhibiting negative effects on the EDLC.

Comparative Example 2

An electrolyte prepared according to the method of Example 4 was stored in an open glass beaker under normal atmosphere for two days. After this storage a concentration of 12 ppm of free acid was detected which is believed to result from the hydrolysation of the TEABF$_4$ with moisture absorbed from the air. In the pressure test the EDLC containing this electrolyte, the EDLC showed a much higher pressure increase rate of greater than about 40 mbar/h. A summary of the results of this example is provided in Table 2.

Example 7

An electrolyte was prepared in a manner identical to Comparative Example 1 with the exception of adding 4000 ppm of triethylamine, a nitrogen-base permanent acid scavenger. After this treatment, free acid was not detectable. The amount of free base was determined by diluting 10 ml electrolyte with 10 ml of high purity water, adding a known amount of hydrochloric acid and titrating the excess back with 0.01 mol/l potassium hydroxide solution until a pH of 7 was reached. The conductivity of this electrolyte solution was about 55 mS/cm at 25° C. In the pressure test the EDLC containing this electrolyte, the EDLC showed a low pressure increase rate of about 12 mbar/h. The leakage current was less than about 0.02 A. A summary of the results of this example is provided in Table 2.

Examples 8-25

An electrolyte was prepared in a manner identical to Example 4 with the exception of adding 4000 ppm of imidazole, a low-odor nitrogen base, as a permanent acid scavenger. A summary of the results of these examples is provided in Table 2.

Example 26

An electrolyte was prepared in a manner identical to Comparative Example 1 with the exception of adding 4000 ppm of triethylamine, a nitrogen base, as a permanent acid scavenger into the EDLC separately from the electrolyte. The amount was calculated based on the electrolyte contained in the EDLC.

This example is showing that the permanent acid scavenger in the EDLC can be added separately from the electrolyte into the device. A summary of the results of this example is provided in Table 2.

TABLE 2

| Example | Initial free acid [ppm] | Acid scavenger | [ppm] | Test conditions | Pressure increase rate | Pressure (est. 2000 h) | Leakage current |
|---|---|---|---|---|---|---|---|
| Comparative Example 1 | 35 | — | — | 3.0 V, 65° C. | 17.5 mbar/h | 35 bar | 0.02 A |
| Comparative Example 2 | 12 | — | — | 3.0 V, 65° C. | >40 mbar/h | >80 bar | 0.06 A |
| Example 7 | 35 | Triethylamine | 4000 | 3.0 V, 65° C. | 10.0 mbar/h | 20 bar | 0.02 A |
| Example 8 | 0 | Imidazole | 4000 | 3.0 V, 65° C. | 8.0 mbar/h | 24 bar | 0.02 A |
| Example 9 | 0 | Oleylamin | 4000 | 3.0 V, 65° C. | 8.0 mbar/h | 16 bar | 0.02 A |
| Example 10 | 0 | Pyridine | 4000 | 3.0 V, 65° C. | 14.5 mbar/h | 29 bar | 0.02 A |
| Example 11 | 0 | Formamid | 4000 | 3.0 V, 65° C. | 9.0 mbar/h | 18 bar | 0.02 A |
| Example 12 | 0 | N-Methyl-formamid | 4000 | 3.0 V, 65° C. | 7.5 mbar/h | 14 bar | 0.02 A |
| Example 13 | 0 | Dicyclohexylurea | 4000 | 3.0 V, 65° C. | 10.0 mbar/h | 20 bar | 0.02 A |
| Example 14 | 0 | N,N-dimethyldodecylamin | 4000 | 3.0 V, 65° C. | 12 mbar/h | 16 bar | 0.02 A |
| Example 15 | 0 | Methyl-imidazole | 4000 | 3.0 V, 65° C. | 8 mbar/h | 16 bar | 0.02 A |
| Example 16 | 0 | Oxazole | 4000 | 3.0 V, 65° C. | 11 mbar/h | 22 bar | 0.02 A |
| Example 17 | 0 | Diazobicycloundecen 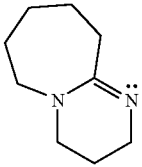 | 4000 | 3.0 V, 65° C. | 10.5 mbar/h | 21 bar | 0.02 A |
| Example 18 | 0 | N,N'-diicyclohexylcarbodiimide | 4000 | 3.0 V, 65° C. | 11.0 mbar/h | 22 bar | 0.02 A |
| Example 19 | 0 | Bis(trimethylsilyl)carbodiimide | 4000 | 3.0 V, 65° C. | 11.5 mbar/h | 23 bar | 0.02 A |
| Example 20 | 0 | Polycarbodiimide of low molecular weight | 4000 | 3.0 V, 65° C. | 10.5 mbar/h | 21 bar | 0.02 A |
| Example 21 | 0 | (2-tert-Butylimino-2-diethylamino-1,3-dimethyl-perhydro-1,3,2-diazaphosphorine) | 4000 | 3.0 V, 65° C. | 8 mbar/h | 16 bar | 0.02 A |
| Example 22 | 0 | 1-tert-Octyl-4,4,4-tris(dimethylamino)-2,2-bis[tris(dimethylamino)phosphoranylidenamino]-$2^5,4^5$-catenadi(phosphazene) 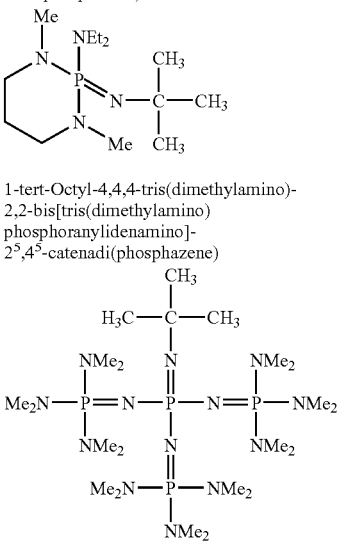 | 4000 | 3.0 V, 65° C. | 7.5 mbar/h | 15 bar | 0.02 A |
| Example 23 | 0 | LiAlH(OMe)3 | 4000 | 3.0 V, 65° C. | 16.5 mbar/h | 33 bar | 0.02 A |
| Example 24 | 0 | Ca(BH4)2 | 4000 | 3.0 V, 65° C. | 10.0 mbar/h | 20 bar | 0.02 A |
| Example 25 | 0 | Tetraethylammonium borohydride | 4000 | 3.0 V, 65° C. | 12.5 mbar/h | 25 bar | 0.02 A |
| Example 26 | 0 | Triethylamine | n.a. | 3.0 V, 65° C. | 12.0 mbar/h | 24 bar | 0.02 A |

These examples show that neutralization of the free acid in the electrolyte by dissolving a permanent acid scavenger additive for the electrolyte can also eliminate free acid in the bulk electrolyte. Advantageous is addition of an excess of base to overshoot the free acid target. The excess of the base enters the EDLC with the electrolyte and continues to absorb acid formed during the life of the EDLC. Especially advantageous is the use of neutral nitrogen bases with low odor potential, of sterically hindered, strong nitrogen bases and of metal hydrides. Also it is suitable to use precursors forming neutral nitrogen bases in the EDLC.

Examples 27-31

These examples demonstrate the use of a solid acid scavenger disposed inside an electrochemical cell to reduce and/or maintain the concentration of free acid in an electrolyte after the electrolyte is loaded into the cell.

As an alternative or addition to the dissolved acid scavenger described in Examples 7-26, an acid scavenger can also be incorporated in an electrochemical cell using a permanent solid acid scavenger. Solids might be preferred because they are less mobile in the device.

Examples 27-30

An EDLC was prepared in a manner identical to competitive example 1 with the exception of dip coating the inner surface of the electrochemical cell with a polymer solution indicated in Table 3. With respect to Example 27, the polycarbodiimide is of higher molecular weight than in Example 20, which effectively renders the polymer insoluble in the electrolyte after evaporation of the dip coating solvent. A summary of the results of this example is provided in Table 2.

Example 33

An EDLC was prepared using an cathode electrode containing 3% by weight of activated aluminum oxide. This modification gave an EDLC with the properties given in Table 3.

Example 34

An EDLC was prepared in a manner identical to Competitive Example 1 with the exceptions of dissolving triethylmethylammonium tetrafluoroborate (TEMABF4) to a concentration of 1.8 mol in propylene carbonate, removing the acid by contacting the electrolyte with free base anion exchangers pellets, Dowex M43 and dissolving 4000 ppm of imidazole as a permanent acid scavenger with low odor. In the pressure test the EDLC containing this electrolyte showed an improved pressure increase rate.

Example 35

An EDLC was prepared in a manner identical to Competitive Example 1 with the exceptions of dissolving spiro quaternary ammonium tetrafluoroborate to a concentration of 1.8 mol in propylene carbonate, removing the acid by contacting the electrolyte with free base anion exchangers pellets, Dowex M43 and dissolving 4000 ppm of imidazole as a permanent acid scavenger with low odor. In the pressure test the EDLC containing this electrolyte showed an improved pressure increase rate.

Example 36

An EDLC was prepared in a manner identical to Competitive Example 1 with the exceptions of dissolving spiro quaternary ammonium tetrafluoroborate to a concentration of 1.8

TABLE 3

| | | Measurement results | | | |
|---|---|---|---|---|---|
| Example | Solid Acid Scavenger in EDLC | Test conditions | Pressure increase rate | Est. Press. after 2000 h | Leakage current |
| Comparative Example 1 | — | 3.0 V, 65° C. | 17.5 mbar/h | 35 bar | 0.02 A |
| Example 27 | Polycarbodiimide | 3.0 V, 65° C. | 10.5 mbar/h | 21 bar | 0.02 A |
| Example 28 | Poly(diallylmethylamine) | 3.0 V, 65° C. | 14.5 mbar/h | 29 bar | 0.02 A |
| Example 29 | poly(methylamino)-1,6-hexane | 3.0 V, 65° C. | 9 mbar/h | 18 bar | 0.02 A |
| Example 30 | poly(methylamino)(2-oxo-1,2-ethane)imino-alkane | 3.0 V, 65° C. | 11.5 mbar/h | 23 bar | 0.02 A |
| Example 31 | Activated aluminium oxide | 3.0 V, 65° C. | 14.5 mbar/h | 29 bar | 0.02 A |

Example 32

An EDLC was prepared in a manner identical to Competitive Example 1 with the exceptions of dissolving tetraethylammonium tetrafluoroborate (TEABF4) to a concentration of 1 mol in propylene carbonate, removing the acid by contacting the electrolyte with free base anion exchangers pellets, Dowex M43 and dissolving 4000 ppm of imidazole as a permanent acid scavenger with low odor. In the pressure test the EDLC containing this electrolyte showed a lower pressure increase.

Example 33

An EDLC was prepared in a manner identical to Competitive Example 1 with the exceptions of dissolving triethylmethylammonium tetrafluoroborate (TEMABF4) to a concentration of 1.8 mol in propylene carbonate, removing the acid by contacting the electrolyte with free base anion exchangers pellets, Dowex M43 and dissolving 4000 ppm of imidazole as a permanent acid scavenger with low odor. In the pressure test the EDLC containing this electrolyte showed an improved pressure increase rate.

mol in acetonitrile, removing the acid by contacting the electrolyte with free base anion exchangers pellets, Dowex M43 and dissolving 4000 ppm of triethylamine as a permanent acid scavenger with low odor. In the pressure test the EDLC containing this electrolyte showed an improved pressure increase rate.

Example 37

An EDLC was prepared in a manner identical to Competitive Example 1 with the exception that in the argon-filled glove box, helium was bubbled through the electrolyte, therefore replacing the higher soluble protective argon gas with less soluble helium. In the pressure test the EDLC containing this electrolyte, the EDLC showed a low pressure increase jump in the beginning and a linear pressure increase rate of 17 mbar/h. The leakage current was <0.02 A.

Having thus described a few particular embodiments of the invention, various alterations, modifications, and improvements will readily occur to those skilled in the art. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for reducing pressure build-up in an electrochemical cell comprising:
   providing an anhydrous nonaqueous electrolyte solution comprising at least one quaternary ammonium salt and at least one anhydrous nonaqueous solvent;
   contacting said electrolyte solution with at least one acid scavenger selected from the group consisting of bis(trimethylsilyl)carbodiimide, low molecular weight polycarbodiimide, 2-tert-butylimino-2-diethylamino-1,3-dimethyl-perhydro-1,3,2-diazaphosphorine, 1-tert-octyl-4,4,4-tris(dimethylamino)-2,2-bis[tris(dimethylamino)phosphoranylidenamino]-2$^5$,4$^5$-catenadi(phosphazene), and derivatives and precursors thereof, wherein the contacting comprises dissolving or suspending the at least one acid scavenger in said electrolyte solution; and
   loading said nonaqueous electrolyte solution into said electrochemical cell.

2. The method of claim 1 wherein said electrochemical cell is an electric double-layer capacitor.

3. The method of claim 2 wherein said electrolyte solution comprises a first free acid concentration prior to said contacting and a second free acid concentration subsequent to said contacting, wherein said second free acid concentration is at least about 30 relative percent less than said first free acid concentration.

4. The method of claim 3 wherein said second free acid concentration is at least about 85 relative percent less than said first free acid concentration.

5. The method of claim 2 wherein said electrolyte solution is essentially free of free acids subsequent to said contacting.

6. The method of claim 2 wherein said contacting is performed prior to said loading.

7. The method of claim 6 wherein said acid scavenger is a solid or semisolid composition.

8. The method of claim 7 wherein said solid or semisolid is selected from the group consisting of film, membrane, coating, lattice, pellet, and particulate.

9. The method of claim 2 wherein said contacting is performed subsequent to said loading.

10. The method of claim 9 wherein said acid scavenger is a solid or semi solid composition.

11. The method of claim 10 wherein said solid or semisolid is selected from the group consisting of film, membrane, coating, lattice, pellet, and particulate.

12. The method of claim 10 wherein said acid scavenger is disposed within said cell.

13. The method of claim 1 wherein said acid scavenger is present in said electrolyte solution in an amount of about 1000 parts per million to about 10,000 parts per million relative to said salt.

14. The method of claim 1 wherein said quaternary ammonium salt is a tetraalkylammonium tetrafluoroborate.

15. The method of claim 14 wherein said solvent is selected from the group consisting of nitrile, linear or cyclic carbonate, and substituted or unsubstituted sulfolane.

16. The method of claim 15 wherein said nitrile is selected from the group consisting of acetonitrile and propionitrile.

17. The method of claim 16 wherein said linear carbonate is selected from the group consisting of dimethyl carbonate, diethyl carbonate, ethyl methyl carbonate, propylene carbonate, and ethylene carbonate.

18. The method of claim 16 where said solvent comprises a cosolvent.

19. An electrolyte comprising:
   a. a solution comprising at least one quaternary ammonium salt and at least one anhydrous nonaqueous solvent; and
   b. an acid scavenger selected from the group consisting of bis(trimethylsilyl)carbodiimide, low molecular weight polycarbodiimide, 2-tert-butylimino-2-diethylamino-1,3-dimethyl-perhydro-1,3,2-diazaphosphorine, 1-tert-octyl-4,4,4-tris(dimethylamino)-2,2-bis[tris(dimethylamino)phosphoranylidenamino]-2$^5$,4$^5$-catenadi(phosphazene), and derivatives and precursors thereof, wherein said acid scavenger is present in an amount of about 1000 parts per million to about 10,000 parts per million relative to said salt, and wherein said acid scavenger is dissolved or suspended in said solution.

20. An electric double-layer capacitor comprising:
   a. a cell having two electrodes;
   b. an electrolyte solution disposed within said cell comprising a solution having at least one quaternary ammonium salt and at least one anhydrous nonaqueous solvent; and
   c. an acid scavenger selected from the group consisting of bis(trimethylsilyl)carbodiimide, low molecular weight polycarbodiimide, 2-tert-butylimino-2-diethylamino-1,3-dimethyl-perhydro-1,3,2-diazaphosphorine, 1-tert-octyl-4,4,4-tris(dimethylamino)-2,2-bis[tris(dimethylamino)phosphoranylidenamino]-2$^5$,4$^5$-catenadi(phosphazene), and derivatives and precursors thereof, wherein said acid scavenger is dissolved or suspended in said electrolyte solution.

21. The electric double-layer capacitor of claim 20, wherein said acid scavenger is present in an amount of about 1000 parts per million to about 10,000 parts per million relative to said salt.

22. The electric double-layer capacitor of claim 20, wherein said capacitor has an operating voltage of at least about 2.7 volts.

23. The electric double-layer capacitor of claim 22 comprising a helium protective gas.

24. The electric double-layer capacitor of claim 20 having an average pressure rate increase of not more than about 17 mbar/hr while operating between 24 and 70 hours at a temperature of at least about 65° C. and a voltage of at least about 3.0V.

25. An electric double-layer capacitor comprising:
   a. a cell having two electrodes;
   b. an electrolyte solution disposed within said cell comprising a solution having at least one quaternary ammonium salt and at least one anhydrous nonaqueous solvent; and
   c. an acid scavenger selected from the group consisting of bis(trimethylsilyl)carbodiimide, 2-tert-butylimino-2-diethylamino-1,3-dimethyl-perhydro-1,3,2-diazaphosphorine, 1-tert-octyl-4,4,4-tris(dimethylamino)-2,2-bis[tris(dimethylamino)phosphoranylidenamino]-25,45-catenadi(phosphazene), and derivatives and precursors thereof, wherein said acid scavenger is solid or semisolid material that is immobilized with respect to said cell.

26. The electric double-layer capacitor of claim 25, wherein said acid scavenger is in a form selected from the group consisting of a film, a membrane, a coating, a lattice, a pellet, and a particulate.

* * * * *